United States Patent [19]

Kuhn

[11] Patent Number: 4,931,075
[45] Date of Patent: Jun. 5, 1990

[54] HIGH CURRENT MULTITERMINAL BUSHING CONTROLLER

[75] Inventor: John J. Kuhn, Gibsonia, Pa.

[73] Assignee: PPG Industries, Inc., Pittsburgh, Pa.

[21] Appl. No.: 390,054

[22] Filed: Aug. 7, 1989

[51] Int. Cl.$^5$ .......................... C03B 5/02; C03B 37/07
[52] U.S. Cl. .................................................. 65/1; 65/2; 65/29; 65/162; 65/DIG. 4; 373/28; 219/494; 219/504
[58] Field of Search ............ 65/1, 2, 29, 162, DIG. 4; 373/28; 219/494, 504

[56] References Cited

U.S. PATENT DOCUMENTS 4,657,572  4/1987  Desai et al. .............................. 65/1
4,780,120  10/1988  Varrasso et al. ......................... 65/29

*Primary Examiner*—Robert L. Lindsay
*Attorney, Agent, or Firm*—John E. Curley

[57] ABSTRACT

An improved bushing controller is shown which utilizes an auxiliary transformer in each of the variable impedance circuits in the controller and the bushing tha the controller is connected to increase the current capability of the controller by a significant percentage. Improved performance of fiber glass bushings producing multiple forming packages is realized.

6 Claims, 3 Drawing Sheets

HIGH CURRENT MULTITERMINAL BUSHING CONTROLLER

The present invention relates to controls for glass fiber forming bushings. More particularly, the present invention relates to improvemnts in control currently used in variable impedance shunts used to control bushing temperature and glass flow. Still more particularly the present invention relates to a fiber glass bushing temperature control system which by use of transformers effectively reduces shunt impedance in existing control systems to thereby increase control currents at the bushing connections without increasing the current handling or heat description requirements of the conventional semiconductor shunts employed in the art.

BACKGROUND OF THE INVENTION

Glass fibers are produced by drawing multiple streams of molten glass at a given rate of speed through orifices or nozzles located in a heated container, known in the fiber glass industry as a bushing. The bushing contains molten glass which is electrically heated and maintained at a given temperature to provide molten glass at a desired viscosity at each of the orifices. The maintenance of a uniform temperature across the face of the bushing; that is, across the area of the bushing on which the orifices are located, is important in providing uniform fiber formation at each orifice.

The fibers drawn from the orifices of a bushing are gathered, after they solidify, into one or more strands, which are then collected on a collet to produce one or more forming packages. In recent years, bushings have increased in size so that bushing having 800 to 2,000 or more orifices are commonplace. It is also common practice to produce more than one strand from larger bushings, and to wind those strands on a single collet to produce corresponding forming packages. Typically, this is accomplished by using one side of a bushing to produce one strand, and the other side to produce a similar second strand. Splitting the bushing in this manner to produce more than one strand requires precise control of the bushing temperature from side to side, so that the strands so produced and collected on a collet will have the same yardage, that is, the same number of yards per pound of glass in a formed package, collected over a given period of time. Even small variations in temperature between the two sides of a split bushing will produce substantial differences in the fibers produced at the orifices, and this will be evidenced by a substantial variation in the weights of the forming packages produced by the respective strands.

In U.S. Pat. Nos. 4,024,336, 4,546,485 and 4,594,087 several control sytems are described which have been developed to address the above problem of temperature control in glass fiber forming bushings. In some instances the devices are costly (U.S. Pat. No. 4,024,336); in other instances they require periodic mechanincal adjustment (U.S. Pat. No. 4,546,485) and in the last mentioned patent, U.S. Pat. No. 4,594,087, which is an improvement over the first two patents referred to herein, the control current is limited by the impedance of the shunt path used. The present invention improves on the operation of the control circuit described in U.S. Pat. No. 4,594,087 by providing increased control current or stated another way, a lower effective shunt path impedance, which in time, improves the performance in split bushing by providing enhanced COV's (coefficient of variations) of package weights obtained from such bushings.

SUMMARY OF THE INVENTION

In accordance with the instant invention the glass fiber strands produced from a fiber glass bushing having multiple forming packages produced thereon are improved in that the COV of the package weights are substantially reduced over those experienced using the aforementioned prior art. The invention leading to the improved bushing performance involves using a conventional fiber glass bushing control curcuit which has a power transformer and associated power pack. The power pack in such a system is responsive to a temperature controller which is, in turn, responsive to changes in temperature across the bushing. The conventional temperature control circuit has present therein variable impedances in shunt with the bushing sections which divide current fed to the various sections. In the instant invention the applicant provides in that conventional circuit an auxiliary transformer for each of the controlled impedance circuits present in the controller. Thus, in controlling a bushing having two sections the bushing controller will have two variable impedance circuits with a transformer for each one in which the primary winding of each of the two transformers is connected in parallel with the secondary of the power transformer and the secondary of each of the two transformers are connected in parallel with each of the two sections of the bushing. The auxillary transformers, which form part of the impedance circuits, are arranged so that the primary to secondary windings have a ratio of 1:1 to 4:1 and preferably 2:1. The polarity of the secondary windings of the transformers is selected such that the sum of the transformer voltage and the bushing voltage is greater than each of those voltages individually and maximize the current flow in each variable impedance shunt.

BRIEF DESCRIPTION OF THE DRAWING

The advantage of the instant invention and the various embodiments that can be employed in the practice of the invention will become apparent to the skilled art from the following detailed description and the accompanying drawings, in which.

DETAILED DESCRIPTION OF THE INVENTION

Figure 1:
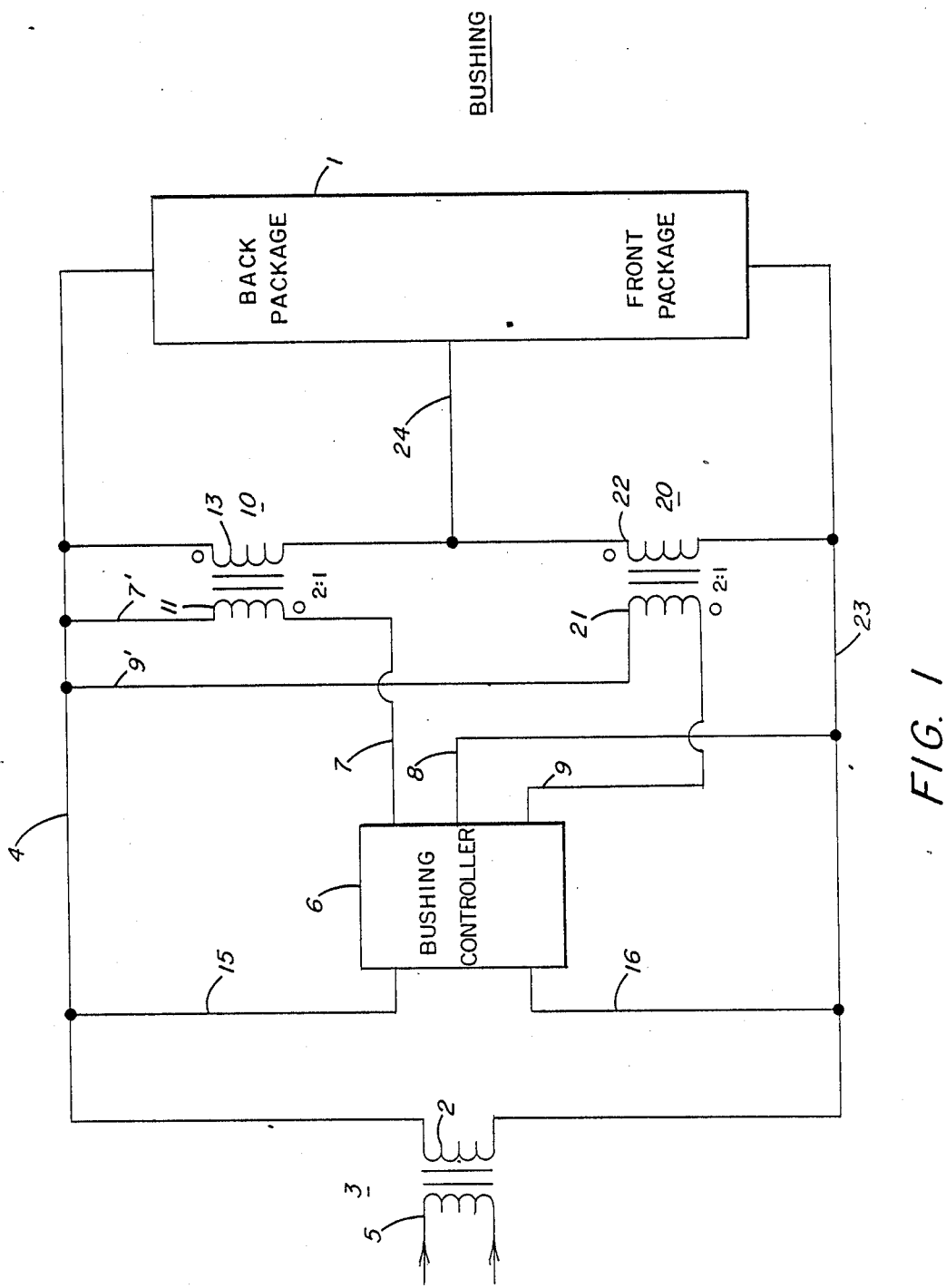
FIG. 1 is a diagrammatic illustration of the instant invention used in conjunction with bushing controller and a fiber glass bushing producing two forming packages.

Turning now to the drawings and in particular to FIG. 1, there is shown a line drawing which illustrates the placement of the transformers in a bushing controller system which is being used to control a bushing producing two glass fiber forming packages at the same time. Thus, as shown a bushing 1 is connected across the secondary winding 2 of a power transformer, generally indicated as 3 and which has a primary winding 5 and a secondary winding 2. The controller 6, which is normally connected to the bushing 1 through lines 7, 8, and 9 directly in accordance with the instant invention, has interposed between it and those lines a circuit containing transformers 10 and 20. Transformer 10 has a primary winding 11 and a secondary winding 13. The windings are constructed so that the primary and secondary windings 11 and 13, respectively, provide a 2:1 turns ratio in the transformer. Similarly the transformer 20 has a primary winding 21 and a secondary winding 22, and the windings again are constructed so that there is provided a 2:1 turns ratio identical to that of transformer 10. As can be seen, the primary of transformer 10 is connected between the bushing controller 6 and bus bar 4 via lines 7 and 7' while the secondary winding 13 of that transformer 10 is connected to the bushing 1 via line 24 and bus bar 4. These connections functionally place the secondary of transformer 10 in parallel with the back half of the bushing 1. In like manner the primary winding 21 of transformer 20 is connected between the bushing controller 6 and bus bar 4 via lines 9 and lines 9'. Line 8 connects controller 6 to bus bar 23 and places the variable impedance in controller 6 in series with the primary winding of the two transformers shown. Secondary winding 22 of transformer 20 is connected across the front half of bushing 1 via lines 24 and bus bar 23. The final connection of the controller 6 to the bushing 1 is by lines 15 and 16 which connect the controller 6 in parallel with the secondary winding 2 of of the power transformer 3.

In the operation of the controller 6 as shown in FIG. 1 the interposing of the transformers 10 and 20 between the controller 6 and the bushing 1 in the manner shown provides a benefit that was previously not available using the controller 6 alone. By placing the transformers 10 and 20 in the circuits shown and connecting them across the portions of the bushing that they control, the net effect is to reduce the resistance in the impedance circuits of the controller thereby providing for the bushing more available current for control thereof. This arrangement provides more precise control of the bushing.

Figure 2:
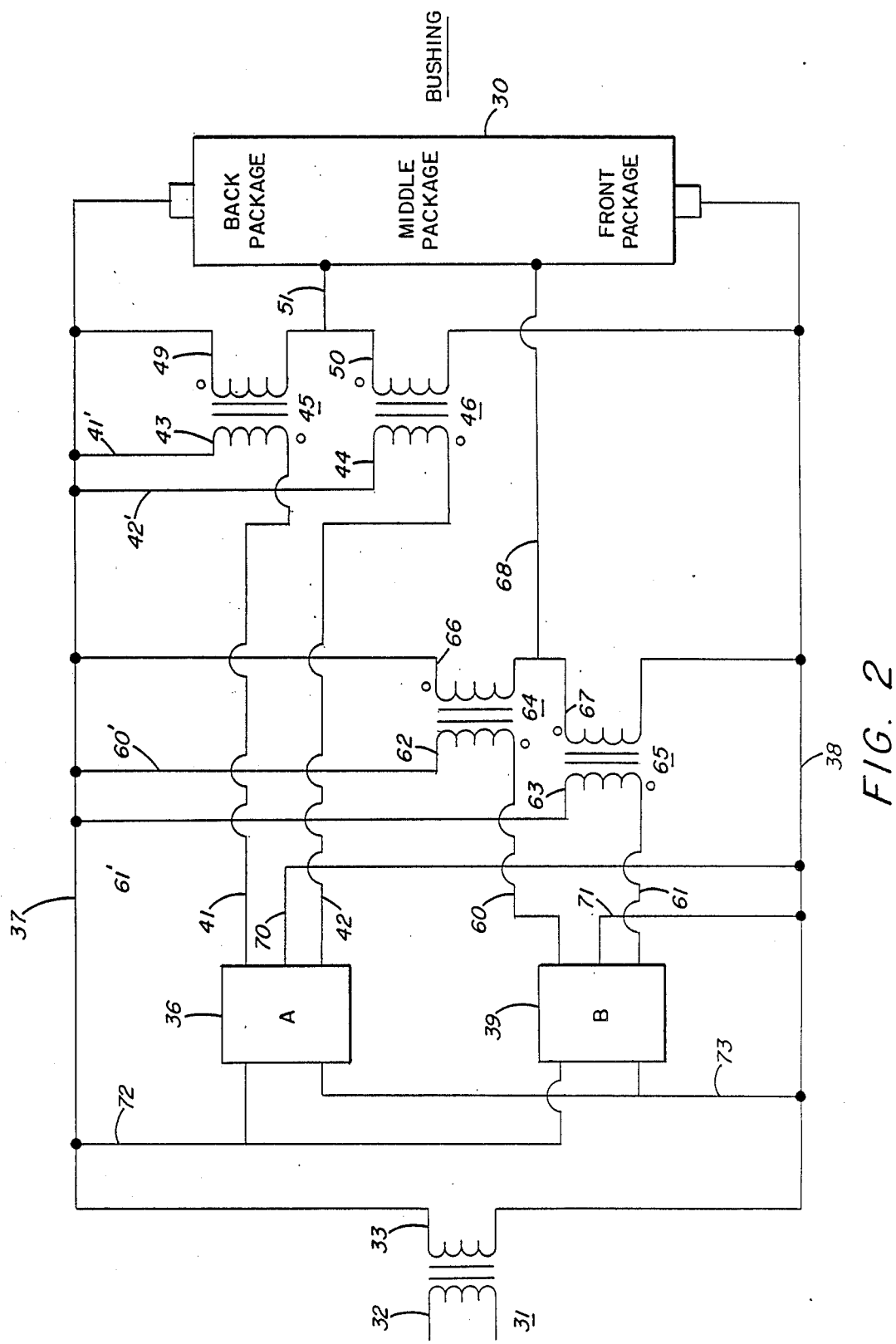
FIG. 2 is a diagrammatic illustration of the instant invention used in conjunction with a bushing controller and fiber glass bushing producing three forming packages.

Turning now to FIG. 2 there is shown a fiber glass bushing 30 which has been arranged to produce three forming packages at the same time. In this embodiment of the invention the power transformer 31, which has a primary winding 32 and a secondary winding 33, is coupled in parallel with the bushing 30 via bus bar 37 and 38. The bushing 30 is divided into three sections each of which produces a forming package on the same take up machine, typically a winder on which several tubes are placed to permit the strands to be wound thereon. The tubes are then removed with the strands on them and taken to other locations for further processing such as drying, end finding and secondary fabrication, steps familiar to those skilled in the art. In the embodiment under discussion two controllers 36 and 39 are employed. The controller 36 is connected through lines 41 and 42 to primary windings 43 and 44 of transformers 45 and 46 respectively. The secondary windings 49 and 50 of the transformers 45 and 46 respectively are connected such that the winding 49 is in parallel with the back portion of the bushing 1 through line 51 and bus bar 37. Lines 41' and 42' connect primary windings 43 and 44 respectively to bus bar 37. In similar manner the winding 50 is connected in parallel with the middle and front section of the bushing through line 51 and bus bar 32.

The controller 39 is connected via lines 60 and 61 to the primary windings 62 and 63 respectively of the transformers 64 and 65. The secondary windings 66 and 67 of transformers 64 and 65 respectively are connected such that winding 66 is in parallel with the middle and back position of the bushing 30 via lines 68 and bus bar 37. Lines 60' and 61' connect primary windings 62 and 63 respectively to bus bar 37. In similar fashion winding 67 is connected in parallel with the front section of the bushing 30 via lines 68 and bus bar 38. Lines 70 and 71 connect controllers 36 and 39 respectively to bus bar 38 and place the variable impedance in each of those controllers in series with the primary winding of the transformers 45, 46, 64 and 65. The final connection of controllers 36 and 39 to the bushing 30 is via lines 72 and 73 which connect the controllers 36 and 39 in parallel with the secondary 33 of power transformer 31.

In both embodiments above described it is an important feature of the invention that the polarity of the secondary winding of the transformers 10 and 20 of FIG. 1 and 45, 46, 64 and 65 of FIG. 2 be selected so that the sum of the transformer voltage and bushing voltage in each of the two embodiments described is greater than each of those voltages in those embodiments taken individually. This insures that the current flow in each variable impedance shunt will be maximized.

The controllers shown in the instant specification are operated in the conventional way and are adjusted in response to temperature changes in the bushings as they occur during operation in the conventional manner described in the prior art and in particular in U.S. Pat. No. 4,594,087. Thus, using the instant invention and the conventional temperature regulation devices normally used to feed signals to bushing controllers, an improvement is provided in that more current is available to control the bushing through the controllers than was heretofore possible using the standard control circuitry.

Therefore, in the instant invention by magnetically coupling the controlled impedance (the controller) to the bushing by a transformer, the shunt current is increased. In the secondary winding circuit of that transformer which includes the controlled impedance device, the transformer winding and the impedance device are connected in series across the bushing and the bushing transformer. The polarity of the transformer secondary winding is such that the sum of its voltage and that of the bushing is greater than each voltage individually, and that insures that the current flow in the shunt circuit is maximized. The turns ratio of the transformers which magnetically couple the variable impedance shunt circuits to the bushing is selected by balancing the available bushing voltage and the current rating and heat dissipation capability of the bushing controller and associated circuit. A practical range of turns ratios employable in accordance with the invention is from 1:1 to 4:1, and preferably in the range of 2:1.

Figure 3:
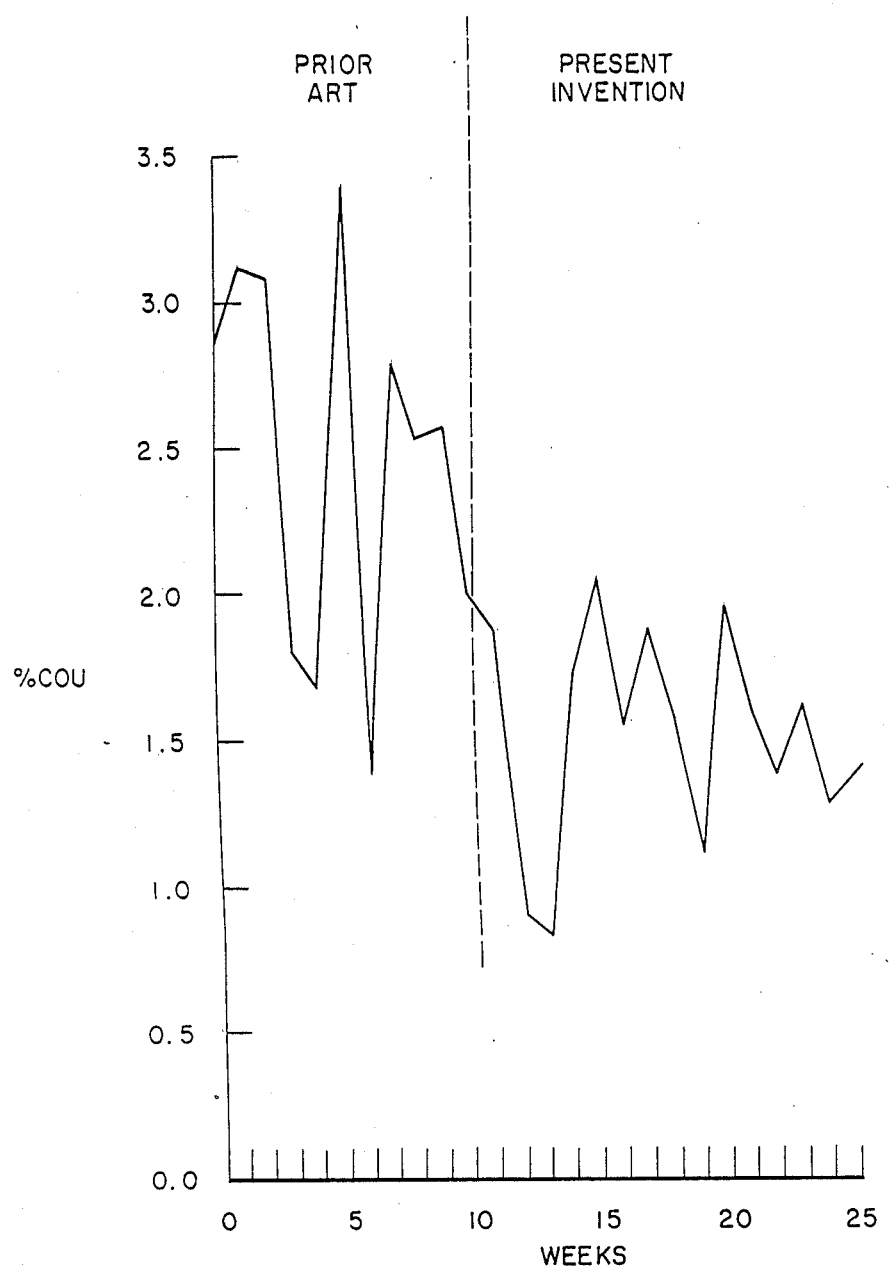
FIG. 3 is a line graph comparing the COV of three strands produced on a bushing producing three packages using a standard controller (PRIOR ART) with three strands produced on the same bushing using the improved controller (PRESENT INVENTION).

As can be appreciated from the description, there are two variable impedance shunt devices in each bushing controller and thus two transformers are required for each bushing controller used. Thus, in FIG. 1 where a single bushing controller was used it is clear that two transformers were required. In the same manner it will be noted in FIG. 2 that since two bushing controllers were used, it was necessary to employ four transformers to accomplish the current increases in the control circuit that the invention provides. In practice, using the controller described in the aforementioned U.S. Pat. No. 4,594,087, the maximum shunt current available for control was 30 amperes. Using a transformer in accordance with the present invention at a turns ratio of 2:1 consistng of 32 turns of #8 AWG magnet wire for the primary winding and 16 turns of bifilar #8 AWG magnet wire for the secondary winding on a two inch stack of EI-175 silicon steel laminations, the maximum shunt current was increased to 60 amperes. This increase in current when applied to a triple package fiber glass forming production bushing, produced the COV variations indicated in FIG. 3 under the heading Present Invention and as shown over the period of 15 weeks. The same bushing, which was operated for ten weeks using the conventional controller and which is also shown on the graph of FIG. 3 under the heading Prior Art, produced consistently higher COV numbers.

While the invention has been described with reference to certain specific illustrated embodiments and examples, it is not intended that it be limited thereby except insofar as appears in the accompanying claims.

I claim:

1. In a fiber glass bushing temperature control circuit which is controlling the temperature of two sections of the bushing which and wherein the bushing is producing two forming packages to provide forming packages of uniform weight and which circuit includes a power source, a bushing controller having two variable impedance circuits in shunt with the bushing for each side of the bushing to be controlled which controls the current fed to each section of the bushing to thereby equalize the temperature in each section to maintain the glass fibers uniform in diameter in each side the improvement comprising connecting a transformer between the controller and the bushing in each of the variable impedance shunts in the controller circuit, each transformer being connected in parallel with the secondary winding of the power transformer and also in parallel with the section of the bushing that it controls, the polarity of the secondary windings of these transformers being selected so that the sum of the transformer voltage and the bushing voltage is greater than each of those voltages individually to thereby maximize the current in the variable impedance shunt of the controller.

2. The bushing control circuit of claim 1 wherein the primary and secondary windings of the transformers in the variable impedance control circuits are sized to provide a wind ratio of 1:1 to 4:1, primary winding to secondary winding.

3. The bushing control circuit of claim 2 wherein the wind ratio of primary winding to secondary winding is 2:1.

4. In the control of a fiber glass forming bushing which has several sections from which strands are being drawn to produce multiple forming packages therefrom and in which the sections are controlled from multiple bushing controllers, each bushing controller having two variable impedances therein connected to the bushing and to a power source to control two sections of the bushing by controlling the current input to those sections of the bushing, the improvement comprising, placing in the variable impedance circuit of each of the controllers present an auxiliary transformer, the auxiliary transformer being connected in parallel with the power transformer and the section of the bushing that its associated variable impedance circuit controls, the polarity of the auxiliary transformers being selected so that the sum of the auxiliary transformer voltage and the bushing is greater than each of those voltages individually.

5. The bushing control circuit of claim 4 wherein the primary to secondary windings of the auxiliary transformers are sized to provide a wind ratio of 1:1 to 4:1.

6. The control circuit of claim 5 wherein the wind ratio is 2:1.

* * * * *